(12) United States Patent
Gong (10) Patent No.: US 12,494,683 B2
(45) Date of Patent: Dec. 9, 2025

(54) SURFACE/INTERIOR PERMANENT MAGNET ROTOR FOR AN ELECTRIC MACHINE

(71) Applicant: GM GLOBAL TECHNOLOGY OPERATIONS LLC, Detroit, MI (US)

(72) Inventor: Cheng Gong, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 265 days.

(21) Appl. No.: 18/349,254

(22) Filed: Jul. 10, 2023

(65) Prior Publication Data

US 2025/0023405 A1    Jan. 16, 2025

(51) Int. Cl.
| | | |
|---|---|---|
| *H02K 1/276* | (2022.01) | |
| *H02K 1/04* | (2006.01) | |
| *H02K 1/278* | (2022.01) | |
| *H02K 7/00* | (2006.01) | |

(52) U.S. Cl.
CPC ............. *H02K 1/276* (2013.01); *H02K 1/04* (2013.01); *H02K 1/278* (2013.01); *H02K 7/006* (2013.01)

(58) Field of Classification Search
CPC ........ H02K 1/276; H02K 1/2766; H02K 1/04; H02K 1/278; H02K 7/006; H02K 1/2706; H02K 1/27; H02K 1/20
See application file for complete search history.

(56) References Cited

U.S. PATENT DOCUMENTS

2018/0358876 A1* 12/2018 Fatemi ............... H02K 1/2766

FOREIGN PATENT DOCUMENTS

| CN | 105915001 A | * | 8/2016 | .......... H02K 21/044 |
| CN | 113708566 A | * | 11/2021 | |
| CN | 115720032 A | * | 2/2023 | .......... H02K 1/2766 |
| DE | 102019110013 A1 | | 10/2019 | |
| DE | 102019117686 A1 | * | 1/2021 | |
| DE | 102019127538 A1 | | 4/2021 | |
| DE | 102019127583 A1 | * | 4/2021 | |
| DE | 102022112346 A1 | | 3/2023 | |
| DE | 102022110024 A1 | | 10/2023 | |
| EP | 3920377 A1 | * | 12/2021 | ............. H02K 1/278 |

(Continued)

OTHER PUBLICATIONS

Machine Translation of DE 102019127583 A1 (Year: 2021).*

(Continued)

*Primary Examiner* — Alexander A Singh
*Assistant Examiner* — Charlie Frank Mann, Jr.
(74) *Attorney, Agent, or Firm* — Quinn IP Law (57) ABSTRACT

A multi-phase, multi-pole surface/interior permanent magnet motor/generator (S/IPM electric machine) includes a rotor disposed on a rotor shaft within an annular stator, and a plurality of interior and surface mounted magnets disposed in axially-oriented slots of the rotor. The interior magnets are single or dual, and V-shaped or U-shaped. The surface-mounted permanent magnets are disposed in axially-oriented slots or recessed grooves in a plurality of axially-stacked, monolithic, single piece, disc-shaped laminate sheets that make up the rotor. For a dual, V-shaped set of interior permanent magnets, the inner V-shaped pair of interior permanent magnets are larger than the outer V-shaped pair of interior permanent magnets.

20 Claims, 4 Drawing Sheets

(56) References Cited

FOREIGN PATENT DOCUMENTS

JP            2019140895 A   *   8/2019              H01F 1/22
RU            2713515 C1   *   2/2020              B60L 13/00

OTHER PUBLICATIONS

Machine Translation of DE 102019117686 A1 (Year: 2021).*
Machine Translation of RU_2713515_C1 (Year: 2020).*
Machine Translation of CN 115720032 A (Year: 2023).*
Machine Translation of EP 3920377 A1 (Year: 2021).*
Machine Translation of JP 2019140895 A (Year: 2019).*
Machine Translation of CN 113708566 A (Year: 2021).*
Machine Translation of CN 105915001 A (Year: 2016).*
German Office Action dated Mar. 18, 2024.

* cited by examiner

SURFACE/INTERIOR PERMANENT MAGNET ROTOR FOR AN ELECTRIC MACHINE

INTRODUCTION

Electric motor/generators, e.g., interior permanent magnet (IPM) electric machines may be employed as torque generative devices on vehicles.

There is a need for electric machines having increased torque density, increased power density, increased power at high speed, and other performance features that minimize flux leakage, improve thermal management, fit within available package space, and/or reuse part or component designs to minimize engineering effort and design validation.

SUMMARY

A multi-phase, multi-pole surface/interior permanent magnet motor/generator (S/IPM electric machine) is described, and includes a rotor disposed on a rotor shaft within an annular stator, and a plurality of interior and surface-mounted permanent magnets disposed in longitudinally-oriented pockets of the rotor.

An aspect of the disclosure may include a rotor assembly for an electric machine that includes a plurality of disc-shaped laminates; a rotor shaft; a wrap; a plurality of interior permanent magnets; and a plurality of surface-mounted permanent magnets. The plurality of disc-shaped laminates are arranged in a stacked configuration on a rotor shaft, and have a plurality of magnetic pole sections that include a plurality of interior cavities and a plurality of surface-mounted cavities. The plurality of interior permanent magnets are disposed in the plurality of interior cavities, and the plurality of surface-mounted permanent magnets are disposed in the plurality of surface-mounted cavities. The wrap encapsulates an outer surface defined by the plurality of disc-shaped laminates and the plurality of surface-mounted permanent magnets.

Another aspect of the disclosure may include each of the plurality of surface-mounted permanent magnets having a cross-section modified to include an arc-shaped outward side.

Another aspect of the disclosure may include the plurality of surface-mounted permanent magnets having a rectangular cross-section that is modified to include an arc-shaped outward side.

Another aspect of the disclosure may include each of the plurality of surface-mounted permanent magnets having a trapezoidal cross-section that is modified to include an arc-shaped outward side.

Another aspect of the disclosure may include each of the plurality of surface-mounted permanent magnets having a triangular cross-section that is modified to include an arc-shaped outward side.

Another aspect of the disclosure may include each of the plurality of surface-mounted permanent magnets having an arced cross-section that includes an arc-shaped outward side.

Another aspect of the disclosure may include the arc-shaped outward side being coextensive with an outer circumference of the rotor assembly.

Another aspect of the disclosure may include the wrap being a carbon fiber fabric that encapsulates the outer surface defined by the plurality of disc-shaped laminates and the plurality of surface-mounted permanent magnets.

Another aspect of the disclosure may include the plurality of interior cavities defined for the plurality of magnetic pole sections being rectangular prisms that are arranged in a single-V configuration.

Another aspect of the disclosure may include the plurality of interior cavities defined for the plurality of magnetic pole sections being rectangular prisms that are arranged in a double-V configuration.

Another aspect of the disclosure may include the plurality of interior cavities defined for the plurality of magnetic pole sections being rectangular prisms that are arranged in a double-V configuration and are absent bridges in the disc-shaped laminates.

Another aspect of the disclosure may include the plurality of interior cavities defined for the plurality of magnetic pole sections being rectangular prisms that are arranged in a U-configuration.

Another aspect of the disclosure may include a via being formed in the axial channel between the rotor assembly and the surface-mounted permanent magnet.

Another aspect of the disclosure may include the permanent magnets being composed from rare earth materials.

Another aspect of the disclosure may include the electric machine having a stator that includes a stator core and electrical windings that are arranged in a distributed winding configuration.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As used herein, the term "electric machine" refers to an electric motor/generator device including a rotor and a stator that is capable of converting electric power to mechanical power and/or converting mechanical power to electric power by electromagnetic effort.

Figure 1:
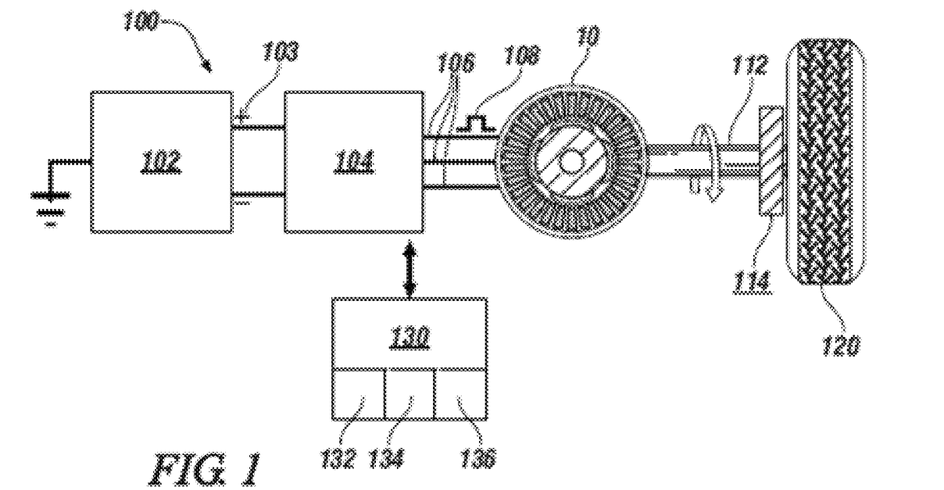
FIG. 1 is a schematic illustration of a system including a multi-phase, multi-pole surface/interior permanent magnet motor/generator (S/IPM electric machine), a DC power source, an inverter, and a controller, in accordance with the present disclosure.

Referring to the drawings, wherein like reference numbers refer to the same or like components in the several Figures, FIG. 1 schematically illustrates a system 100 that includes a multi-phase, multi-pole, rotary surface/interior permanent magnet electric motor/generator (S/IPM electric machine) 10 that is arranged to generate and transfer torque to an actuator 120 to effect work, and a controller 130 that executes control routines to control and manage operation thereof. In one embodiment, the system 100 is disposed on a vehicle (not shown). When disposed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the system 100 may be an element of a stationary system.

The system 100 also includes an inverter 104 and a DC power source 102. The DC power source 102 connects to the inverter 104 via a high-voltage DC bus 103, and the inverter 104 connects to the electric machine 10 via a plurality of electrical power lines 106.

The inverter 104 includes a plurality of semiconductor switches (not shown) that are arranged and controllable to transform DC electric power to AC electric power, and transform AC electric power to DC electric power, employing a pulse-width modulation signal 108 or another control technique. The inverter 104 is arranged and is controllable to transform DC electric power originating from the DC power source 102 to AC electric power to actuate the S/IPM electric machine 10 via electromagnetic effort. The S/IPM electric machine 10 is controllable to rotate and generate mechanical torque that is transferred via a rotatable member 112 and a geartrain 114 to the actuator 120 when operating in a torque generating mode. The S/IPM electric machine 10 is controllable to generate AC electric power from mechanical torque originating at the actuator 120 via electromagnetic effort, which is transformed by the inverter 104 to DC electric power for storage in the DC power source 102 when operating in an electric power generating mode. The actuator 120 includes, in one embodiment, a vehicle wheel that transfers torque to a ground surface to effect forward motion as part of a traction propulsion system for a vehicle. The DC power source 102 may be in the form of a rechargeable electrochemical battery device, a fuel cell, an ultracapacitor, and/or another electrical energy storage/generation technology.

The controller 130 may be embodied as one or more digital computing devices, and may include one or more processors 134 and memory 132. A control routine 136 may be stored as an executable instruction set in the memory 132 and executed by one of the processors 134 of the controller 130. The controller 130 is in communication with the inverter 104 to control operation thereof in response to execution of the control routine 136 to operate the S/IPM electric machine 10.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The S/IPM electric machine 10 employs a topology that combines a surface-mounted PM motor and an interior PM motor. The combined use of surface and interior permanent magnets facilitates an increase in torque density without changing the stator design, inverter current, etc. The combined use of surface and interior permanent magnets increases flux, resulting in higher power at peak high speeds.

Figure 2:
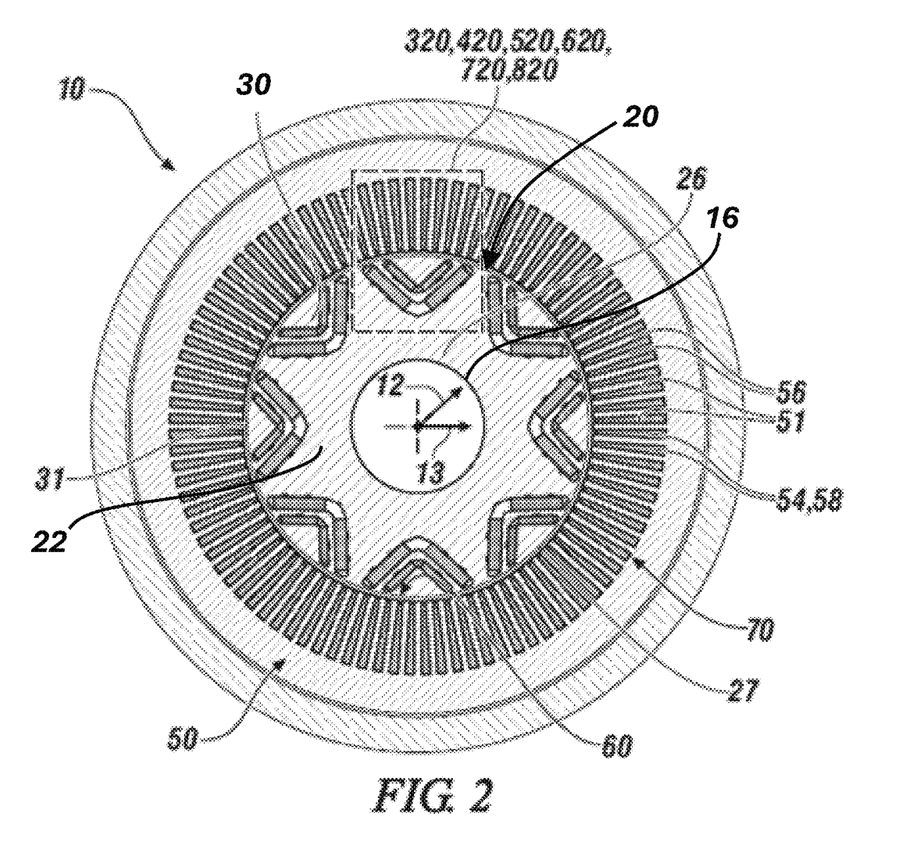
FIG. 2 schematically illustrates a cut-away end view of an embodiment of a S/IPM electric machine, in accordance with the disclosure.

FIG. 2 schematically illustrates an embodiment of the S/IPM electric machine 10. The S/IPM electric machine 10 includes a cylindrically-shaped rotor assembly 20 arranged on a rotor shaft 16 and disposed within an annularly-shaped stator 50, wherein the rotor assembly 20 is coaxial with a rotor opening 60 that is formed in the stator 50. Other elements of the S/IPM electric machine 10, e.g., end caps, shaft bearings, electrical connections, etc., are included but not shown. The S/IPM electric machine 10 is illustrated in context of a radial axis 13 and a longitudinal axis 12, wherein the longitudinal axis 12 is defined by the rotor shaft 16.

The rotor assembly 20 includes a plurality of stamped, ferrous laminate sheets 22 that are arranged in a stack, assembled onto the rotor shaft 16, and encased in an annular sleeve or wrap 40. Each of the laminate sheets 22 is a disk-shaped device formed with a uniform thickness and a constant outer diameter, and has a centrally-located shaft aperture 26 and a plurality of magnetic pole sections 30. In one embodiment, the laminate sheets 22 are fabricated by a stamping process.

The magnetic pole sections 30 repeat around a circumference of the laminate sheets 22, and define the quantity of magnetic poles of the rotor assembly 20. As shown, and by way of a non-limiting example, there are eight magnetic pole sections 30, defining a quantity of four magnetic pole pairs for rotor assembly 20. It is appreciated that there may be other quantities of the magnetic pole sections 30 in other embodiments, without limitation.

Each of the magnetic pole sections 30 includes a plurality of interior cavities 32, which may be a double-V arrangement (as shown), or another arrangement. Other examples of arrangements are described hereinbelow. Each of the magnetic pole sections 30 includes one or more surface cavities 34.

The plurality of laminate sheets 22 are assembled with the rotor shaft 16 being inserted into the shaft apertures 26 such that the magnetic pole sections 30 are aligned to form a plurality of interior cavities 32 and surface cavities 34 that are parallel to the longitudinal axis 12 defined by the rotor shaft 16. The plurality of interior cavities 32 accommodate and house interior permanent magnets 33, which are prismatic-shaped elements having rectangular, trapezoidal, dovetailed, or other cross-sectional shapes. The plurality of surface cavities 34 accommodate and house surface-mounted permanent magnets 35. Additional details related to the plurality of interior cavities 32, the interior permanent magnets 33, the surface cavity 34, and the surface-mounted permanent magnets 35 are described in greater detail with reference to FIGS. 3 through 8.

Both or either of the interior permanent magnets 33 and the surface-mounted permanent magnets 35 may be fabricated from rare-earth materials, and may be described in terms of a longitudinal axis and a rectangular cross-sectional area having a major axis and a minor axis. A rare-earth magnet is formed from alloys of rare-earth materials, such as dysprosium-reduced material or another suitable material. Other rare-earth materials may include neodymium and samarium. Alternatively, either or both of the interior permanent magnets 33 and surface-mounted permanent magnets 35 may be fabricated from non-rare earth material such as Ferrite, Alnico, iron-cobalt (FeCo) and manganese-bismuth (MnBi), or a combination thereof.

The annular wrap 40 is fabricated from carbon fiber or another material, and encapsulates the outer peripheral surface of the rotor assembly 20. By way of non-limiting examples, the wrap may instead be fabricated from stainless steel, glass fiber, titanium alloy, etc. The annular wrap 40 is arranged to provide retention force that counteracts the centrifugal force associated with rotation of the rotor assembly 20.

External dimensions associated with the rotor assembly 20 include an outer diameter 29. The outer diameter 29 is associated with the outer periphery 27 of the rotor assembly 20 and the annular wrap 40, and is measured in relation to the radial axis 13.

The stator 50 includes a plurality of stamped, ferrous laminate sheets 52. Each of the laminate sheets 52 is a disk-shaped device formed having a uniform thickness, and each has a centrally-located inner aperture 51 that is formed to dimensionally accommodate the outer diameter 29 of the rotor assembly 20 including the annular wrap 40. Each of the laminate sheets 52 also includes a plurality of radially-oriented, inwardly-projecting teeth 56. The laminate sheets 52 are arranged in a stack such that the inner apertures 51 are aligned and the inwardly-projecting teeth 56 are aligned. The laminate sheets 52 are assembled into a unitary device. A rotor opening 60 is formed by the aligned inner apertures 51 of the plurality of laminate sheets 52, and a plurality of longitudinally-oriented slots 58 are formed between the aligned inwardly-projecting teeth 56 of the plurality of laminate sheets 52.

The slots 57 are configured to accommodate electrical windings 54 that are arranged in a distributed electrical winding assembly 70 that is fabricated with stranded conductive wire in one embodiment. The stranded conductive wire may be fabricated from any suitable material, e.g., copper. Internal dimensions associated with the stator 50 include an inner diameter 59, which defines an inner peripheral surface 28 of the stator 50. Alternatively, the electrical windings 54 may be arranged in a concentrated winding configuration.

An air gap 31 is formed between an outer peripheral surface of the rotor assembly 20 and the inner peripheral surface 28 of the stator 50.

The distributed electrical winding assembly 70 of the electrical windings 54 in the stator 50 may be arranged to provide a revolving electrical field arrangement that provides a rotating magnetic field in the stator 50 by applying a polyphase alternating current, which may be supplied by an integrated power inverter. In one embodiment, the polyphase alternating current is a three-phase alternating current. During operation, electromagnetic forces that are induced in the electrical windings 54 introduce magnetic flux that acts upon the interior permanent magnets 33 and surface-mounted permanent magnets 35 embedded in the rotor assembly 20, thus exerting a torque to cause the rotor assembly 20 to rotate about the rotor shaft 16 within the stator 50. Alternating current (AC) motors may be divided into AC induction motors and AC synchronous motors. In a revolving field type of AC synchronous motor in which a stator is provided with armature windings and a rotor assembly is provided with magnet windings, the rotor assembly is changed to an electromagnet by excitation of the magnet windings of the rotor assembly, and the rotor assembly rotates by applying a polyphase alternating current to the stator. In applications wherein the electric power originates from a DC power supply, the polyphase alternating current is generated by the power inverter.

The electrical windings of the stator 50 are arranged with a quantity of electrical phases and a quantity of electrical turns per phase. Depending on the specific arrangement, the quantity of electrical phases may be between 3 and 6, and the quantity of layers of conductors may be between 4 and 12.

Specific geometric design parameters associated with the rotor assembly 20 and the stator 50 of the S/IPM electric machine 10 are identified, including a first set of geometric design parameters associated with the rotor assembly 20 and a second set of geometric design parameters associated with the stator 50. Preferred ranges for the first and second sets of geometric design parameters are selected to achieve motor operating parameters that include a high drive-cycle efficiency, e.g., greater than 90% peak efficiency over a wide speed/load operating range, a high torque density, a wide peak power range, a maximum speed of 21,000 rpm or greater.

FIGS. 3 through 8 each depicts a schematic cross-sectional cut-away end view of a fragment of an embodiment of the S/IPM electric machine 310, illustrating a single magnetic pole section of a rotor assembly mounted on a rotor shaft, and a corresponding portion of a stator, with an interposed air gap.

Figure 3:
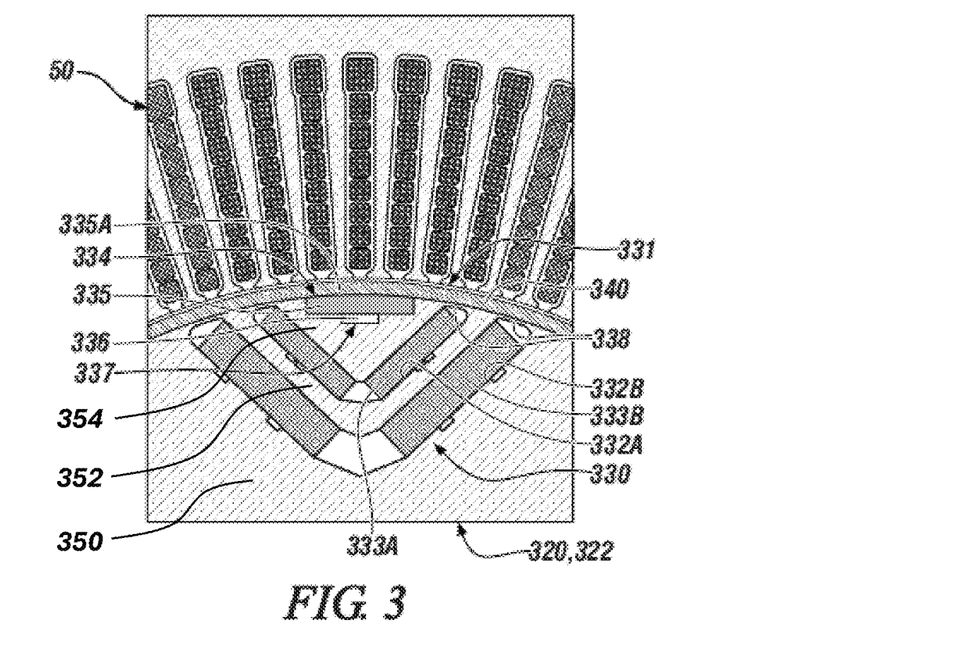
FIGS. 3 through 8 schematically illustrate embodiments of a single magnetic pole section for a rotor of a S/IPM electric machine, in accordance with the disclosure.

FIG. 3 schematically illustrates an embodiment of a magnetic pole section 330 for rotor assembly 320 that is composed of a plurality of stamped, ferrous laminate sheets 322 that are arranged in a stack, and are analogous to the laminate sheets 22 that are described with reference to FIG. 2. The rotor assembly 320 may be employed in the S/IPM electric machine 10 with stator 50 that are described with reference to FIGS. 1 and 2. In this embodiment, the magnetic pole section 330 includes an interior permanent magnet portion 331 being arranged in a double-V configuration, including first inner cavities 332A and second inner cavities 332B being arranged in V configurations, and containing first and second interior permanent magnets 333A and 333B, respectively. The first inner cavities 332A and associated first interior permanent magnets 333A may have smaller cross-sectional areas than the second inner cavities 332B and second interior permanent magnets 333B in one embodiment. In this embodiment, bridges 338 are arranged between ends of the first and second interior permanent magnets 333A and 333B and an outer periphery 339 of the rotor assembly 320. In this embodiment, a surface-mounted permanent magnet 335 is disposed in a surface cavity 334. In this embodiment, the surface-mounted permanent magnet 335 has a rectangular cross-section that is modified to include an arc-shaped outward side 335A that is coextensive with the outer periphery 339 of the rotor assembly 320. Alternatively, the surface-mounted permanent magnet 335 may have a rectangular cross-section. In one embodiment, the surface cavity 334 includes an axial channel 337 formed at a bottom portion, and a via 336 is formed in the axial channel 337 between the rotor assembly 320 and the surface-mounted permanent magnet 335. The via 336 may be employed in a cooling system in one embodiment. Wrap 340 is arranged on the outer periphery 339.

Figure 4:
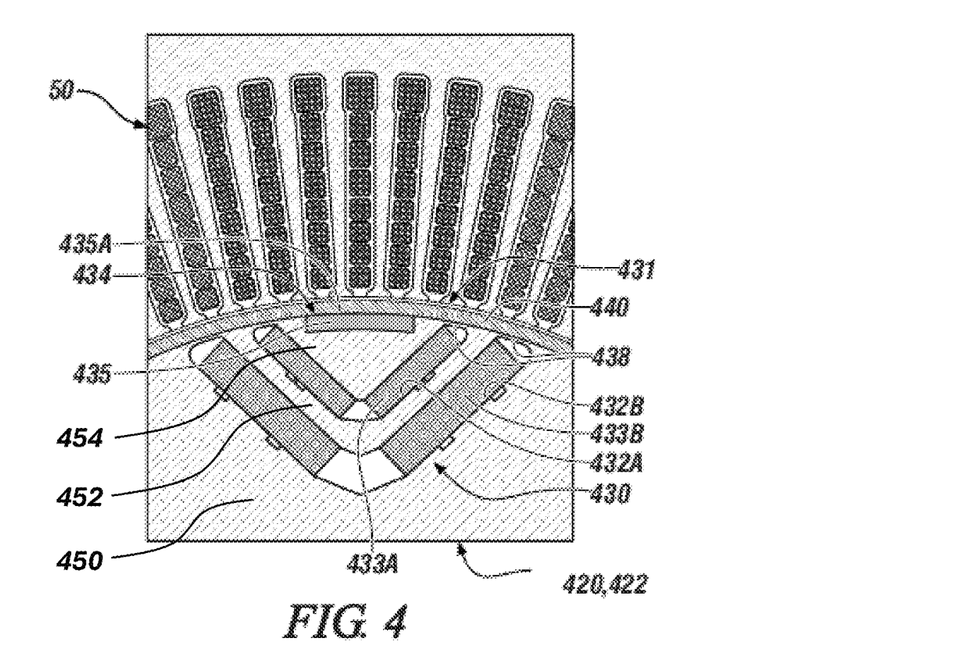

FIG. 4 schematically illustrates an embodiment of a magnetic pole section 430 for rotor assembly 420 that is composed of a plurality of stamped, ferrous laminate sheets 422 that are arranged in a stack, and are analogous to the laminate sheets 22 that are described with reference to FIG. 2. The rotor assembly 420 may be employed in the S/IPM electric machine 10 with stator 50 that are described with reference to FIGS. 1 and 2. In this embodiment, the magnetic pole section 430 includes an interior permanent magnet portion 431 being arranged in a double-V configuration, including first inner cavities 432A and second inner cavities 432B being arranged in V configurations, and containing first and second interior permanent magnets 433A and 433B, respectively. The first inner cavities 432A and associated first interior permanent magnets 433A may have smaller cross-sectional areas than the second inner cavities 432B and second interior permanent magnets 433B in one embodiment. In this embodiment, bridges 438 are arranged between ends of the first and second interior permanent magnets 433A and 433B and an outer periphery 439 of the rotor assembly 420. In this embodiment, a surface-mounted permanent magnet 435 is disposed in a surface cavity 434. In this embodiment, the surface-mounted permanent magnet 435 has an arced cross-section that includes an arc-shaped outward side 435A that is coextensive with the outer periphery 439 of the rotor assembly 420. Wrap 440 is arranged on the outer periphery 439.

Figure 5:
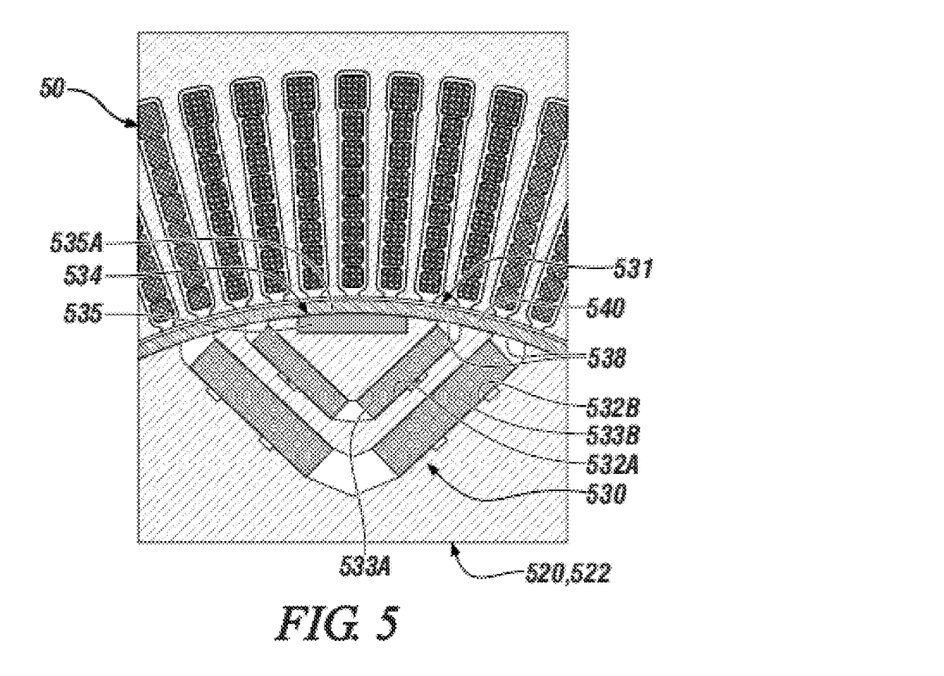

FIG. 5 schematically illustrates an embodiment of a magnetic pole section 530 for rotor assembly 520 that is composed of a plurality of stamped, ferrous laminate sheets 522 that are arranged in a stack, and are analogous to the laminate sheets 22 that are described with reference to FIG. 2. The rotor assembly 520 may be employed in the S/IPM electric machine 10 with stator 50 that are described with reference to FIGS. 1 and 2. In this embodiment, the magnetic pole section 530 includes an interior permanent magnet portion 531 being arranged in a double-V configuration, including first inner cavities 532A and second inner cavities 532B being arranged in V configurations, and containing first and second interior permanent magnets 533A and 533B, respectively. The first inner cavities 532A and associated first interior permanent magnets 533A may have smaller cross-sectional areas than the second inner cavities 532B and second interior permanent magnets 533B in one embodiment. In this embodiment, the disc-shaped laminates of the rotor assembly 520 have voids 538 between ends of the first and second interior permanent magnets 533A and 533B and an outer periphery 539 of the rotor assembly 520. In this embodiment, a surface-mounted permanent magnet 535 is disposed in a surface cavity 534. In this embodiment, the surface-mounted permanent magnet 535 has an arced cross-section that includes an arc-shaped outward side 535A that is coextensive with the outer periphery 539 of the rotor assembly 520. Wrap 540 is arranged on the outer periphery 539.

Figure 6:
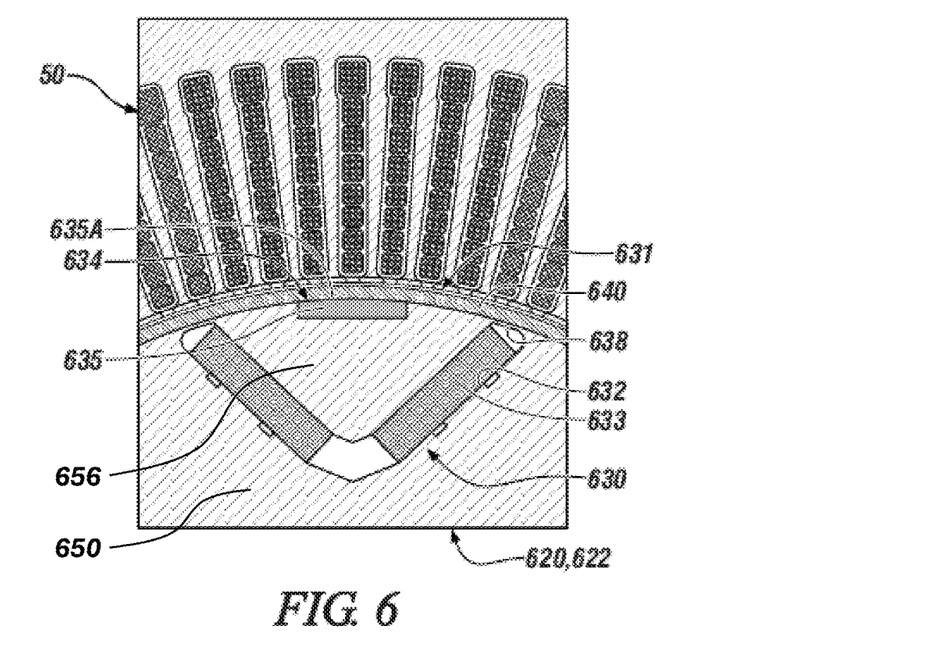

FIG. 6 schematically illustrates an embodiment of a magnetic pole section 630 for rotor assembly 620 that is composed of a plurality of stamped, ferrous laminate sheets 622 that are arranged in a stack, and are analogous to the laminate sheets 22 that are described with reference to FIG. 2. The rotor assembly 620 may be employed in the S/IPM electric machine 10 with stator 50 that are described with reference to FIGS. 1 and 2. In this embodiment, the magnetic pole section 630 includes an interior permanent magnet portion 631 being arranged in a single-V configuration, including inner cavities 632 being arranged in V configurations, and containing interior permanent magnets 633. In this embodiment, bridges 638 are arranged in the disc-shaped laminates of the rotor assembly 620 between ends of the first interior permanent magnets 633 and an outer periphery 639 of the rotor assembly 620. In this embodiment, a surface-mounted permanent magnet 635 is disposed in a surface cavity 634. In this embodiment, the surface-mounted permanent magnet 635 has a rectangular cross-section that includes an arc-shaped outward side 635A that is coextensive with the outer periphery 639 of the rotor assembly 620. Wrap 640 is arranged on the outer periphery 639.

Figure 7:
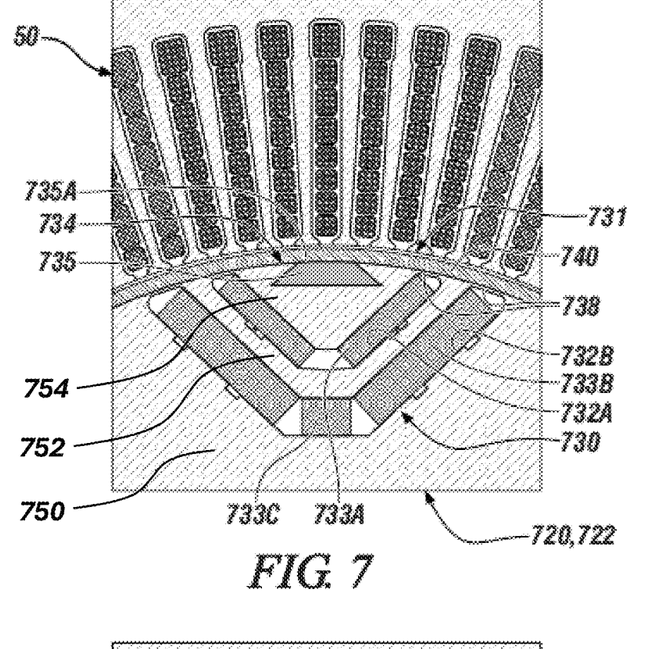

FIG. 7 schematically illustrates an embodiment of a magnetic pole section 730 for rotor assembly 720 that is composed of a plurality of stamped, ferrous laminate sheets 722 that are arranged in a stack, and are analogous to the laminate sheets 22 that are described with reference to FIG. 2. The rotor assembly 720 may be employed in the S/IPM electric machine 10 with stator 50 that are described with reference to FIGS. 1 and 2. In this embodiment, the magnetic pole section 730 includes an interior permanent magnet portion 731 being arranged in a U-configuration, including first inner cavities 732A being arranged in a V configuration, and containing first interior permanent magnets 733A, and second inner cavities 732B being arranged in a U configuration, and containing first and third interior permanent magnets 733A and 733C, respectively. The first inner cavities 732A and associated first interior permanent magnets 733A may have smaller cross-sectional areas than the second inner cavities 732B and second interior permanent magnets 733B in one embodiment. In this embodiment, bridges 738 are arranged in the disc-shaped laminates between ends of the first and second interior permanent magnets 733A and 733B and an outer periphery 739 of the rotor assembly 720. In this embodiment, a surface-mounted permanent magnet 735 is disposed in a surface cavity 734. In this embodiment, the surface-mounted permanent magnet 735 has a trapezoidal cross-section that includes an arc-shaped outward side 735A that is coextensive with the outer periphery 739 of the rotor assembly 720. Wrap 740 is arranged on the outer periphery 739.

Figure 8:
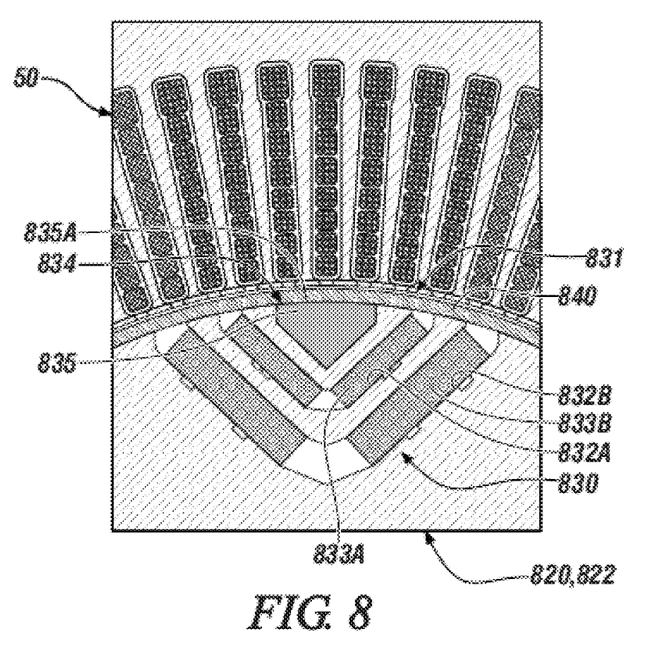

FIG. 8 schematically illustrates an embodiment of a magnetic pole section 830 for rotor assembly 820 that is composed of a plurality of stamped, ferrous laminate sheets 822 that are arranged in a stack, and are analogous to the laminate sheets 22 that are described with reference to FIG. 2. The rotor assembly 820 may be employed in the S/IPM electric machine 10 with stator 50 that are described with reference to FIGS. 1 and 2. In this embodiment, the magnetic pole section 830 includes an interior permanent magnet portion 831 being arranged in a double-V configuration, including first inner cavities 832A and second inner cavities 832B being arranged in V configurations, and containing first and second interior permanent magnets 833A and 833B, respectively. The first inner cavities 832A and associated first interior permanent magnets 833A may have smaller cross-sectional areas than the second inner cavities 832B and second interior permanent magnets 833B in one embodiment. In this embodiment, a surface-mounted permanent magnet 835 is disposed in a surface cavity 834. In this embodiment, the surface-mounted permanent magnet 835 has a triangular cross-section that includes an arc-shaped outward side 835A that is coextensive with the outer periphery 839 of the rotor assembly 820. Wrap 840 is arranged on the outer periphery 839.

The concepts described herein provide a S/IPM electric machine including a rotor assembly that is arranged with a plurality of magnetic pole sections that each includes an interior permanent magnet portion and a surface-mounted permanent magnet, wherein a wrap portion is arranged on an outer periphery of the rotor assembly. The embodiments described herein may provide increased torque density, increased power density, decreased flux leakage, and other benefits as compared to similarly sized electric machines that lack such arrangements. This provides a better potential to balance the cost, energy consumption, and performance by introducing design freedoms not otherwise available.

Embodiments of the electric machine described herein are configured to simultaneously achieve operating parameters related to torque, speed, power, efficiency, packaging and other constraints, including operating with a 48V DC power source. The geometric design parameters associated with drive cycle efficiency and active material cost of the permanent magnets in the rotor assembly may have the following features. The rotor permanent magnets may be configured as a simple V-arrangement or a flat-type to reduce either the mass of magnet, or to reduce the quantity of permanent magnet pieces utilized in the rotor assembly. The first and second sets of geometric design parameters are identified to ensure minimum usage of permanent magnets, while meeting other performance criteria such as torque density, high drive-cycle efficiency, protection against permanent demagnetization, and minimum torque ripple.

The rotor bridge thickness, when employed, is in a range between 0.8 mm and 2.0 mm to minimize leakage of magnet flux, increase power factor, minimize magnet usage, and meet stress requirements at maximum operation speed of between 18000 and 25000 rpm. When applicable, e.g., in the case of V-type layout, a central post may be introduced to the rotor body to increase mechanical robustness.

Multiple features are introduced to enhance the motor performance. These include the stator design being configured as distributed winding configuration, as opposed to fractional slot concentrated winding, for improved field weakening performance, reduced core losses, and for better overload thermal capability. The ranges of the geometric design parameters are identified to achieve low copper and core losses, high torque density, high drive-cycle efficiency, and minimum torque ripple.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A rotor assembly for an electric machine, comprising:
a plurality of monolithic, single-piece, disc-shaped laminates; a rotor shaft; a wrap; a plurality of bridge segments, a plurality of interior permanent magnets; and a plurality of surface-mounted permanent magnets;
wherein the plurality of monolithic, single-piece, disc-shaped laminates are arranged in an axially-stacked configuration on the rotor shaft;
wherein the plurality of monolithic, single-piece, disc-shaped laminates includes a plurality of magnetic pole sections;
wherein the plurality of magnetic pole sections include a plurality of axially-oriented interior slots and a plurality of axially-oriented recessed grooves disposed in the plurality of monolithic, single-piece, disc-shaped laminates;
wherein the plurality of interior permanent magnets are disposed in the plurality of axially-oriented interior slots;
wherein the plurality of surface-mounted permanent magnets are disposed in the plurality of axially-oriented recessed grooves; and
wherein the wrap encapsulates an outer surface defined by the plurality of monolithic, single-piece, disc-shaped laminates and the plurality of surface-mounted permanent magnets.

2. The rotor assembly of claim 1, wherein each of the plurality of surface-mounted permanent magnets includes a cross-section modified to include an arc-shaped outward side.

3. The rotor assembly of claim 2, comprising each of the plurality of surface-mounted permanent magnets having a rectangular cross-section that is modified to include an arc-shaped outward side.

4. The rotor assembly of claim 2, comprising each of the plurality of surface-mounted permanent magnets having a trapezoidal cross-section that is modified to include an arc-shaped outward side.

5. The rotor assembly of claim 2, comprising each of the plurality of surface-mounted permanent magnets having a triangular cross-section that is modified to include an arc-shaped outward side.

6. The rotor assembly of claim 2, comprising each of the plurality of surface-mounted permanent magnets having an arced cross-section that includes an arc-shaped outward side.

7. The rotor assembly of claim 2, wherein the arc-shaped outward side is coextensive with an outer circumference of the rotor assembly.

8. The rotor assembly of claim 1, wherein the wrap comprises a carbon fiber fabric that encapsulates the outer surface defined by the plurality of disc-shaped laminates and the plurality of surface-mounted permanent magnets.

9. The rotor assembly of claim 1,
wherein the plurality of axially-oriented interior slots defined for the plurality of magnetic pole sections comprise rectangular prisms that are arranged in a single-V configuration; and
wherein the plurality of axially-oriented interior slots are V-shaped.

10. The rotor assembly of claim 1,
wherein the plurality of axially-oriented interior slots defined for the plurality of magnetic pole sections comprise a plurality of rectangular prisms that are arranged in a nested double-V configuration comprising:
(1) an inner pair of V-shaped rectangular prisms disposed in an inner V-shaped slot; and
(2) an outer pair of V-shaped rectangular prisms disposed in an outer V-shaped slot;
wherein the outer pair of V-shaped rectangular prisms are smaller than the inner pair of V-shaped rectangular prisms; and
wherein the outer V-shaped slot is smaller than the inner V-shaped slot.

11. The rotor assembly of claim 10, further comprising a central post disposed in-between the plurality of rectangular prisms that are arranged in a nested double-V configuration.

12. The rotor assembly of claim 1, wherein the plurality of axially-oriented interior slots defined for the plurality of magnetic pole sections comprise at least three rectangular prisms that are arranged in a single U-shaped configuration.

13. The rotor assembly of claim 1, wherein each of the plurality of axially-oriented recessed grooves includes an axial channel, wherein a via is formed in the axial channel between the rotor assembly and the surface-mounted permanent magnet.

14. The rotor assembly of claim 1, wherein the plurality of bridge segments have a radial thickness that ranges from 0.8 mm to 2 mm.

15. A multi-phase, multi-pole permanent magnet electric machine (electric machine), comprising:
a rotor assembly disposed within an annular stator; and
the stator including a stator core and a plurality of electrical windings arranged in a distributed winding configuration;
the rotor assembly including:
a plurality of monolithic, single-piece, disc-shaped laminates; a rotor shaft; a wrap; a plurality of bridge segments, a plurality of interior permanent magnets; and a plurality of surface-mounted permanent magnets;
wherein the plurality of monolithic, single-piece, disc-shaped laminates are arranged in an axially-stacked configuration on the rotor shaft;
wherein the plurality of monolithic, single-piece, disc-shaped laminates includes a plurality of magnetic pole sections;
wherein the plurality of magnetic pole sections include a plurality of axially-oriented interior slots and a plurality of axially-oriented recessed grooves disposed in the plurality of monolithic, single-piece, disc-shaped laminates;
wherein the plurality of interior permanent magnets are disposed in the plurality of axially-oriented interior slots;
wherein the plurality of surface-mounted permanent magnets are disposed in the plurality of axially-oriented recessed grooves; and
wherein the wrap encapsulates an outer surface defined by the plurality of monolithic, single-piece, disc-shaped laminates and the plurality of surface-mounted permanent magnets.

16. The electric machine of claim 15, wherein each of the plurality of surface-mounted permanent magnets includes a cross-section modified to include an arc-shaped outward side.

17. The electric machine of claim 16, comprising each of the plurality of surface-mounted permanent magnets having a rectangular cross-section that is modified to include an arc-shaped outward side, wherein the arc-shaped outward side is coextensive with an outer circumference of the rotor assembly.

18. The electric machine of claim 16, comprising each of the plurality of surface-mounted permanent magnets having a trapezoidal cross-section that is modified to include an arc-shaped outward side, wherein the arc-shaped outward side is coextensive with an outer circumference of the rotor assembly.

19. The electric machine of claim 16, further comprising the electric machine being coupled to a vehicle wheel of a propulsion system for a vehicle.

20. A rotor assembly for an electric machine, comprising:
a plurality of monolithic, single-piece, disc-shaped laminates; a rotor shaft; a wrap; a plurality of bridge segments, a plurality of interior permanent magnets; and a plurality of surface-mounted permanent magnets;
wherein the plurality of monolithic, single-piece, disc-shaped laminates are arranged in an axially-stacked configuration on the rotor shaft;
wherein the plurality of monolithic, single-piece, disc-shaped laminates includes a plurality of magnetic pole sections;
wherein the plurality of magnetic pole sections include a plurality of axially-oriented interior slots and a plurality of axially-oriented recessed grooves disposed in the plurality of monolithic, single-piece, disc-shaped laminates;
wherein the plurality of interior permanent magnets are disposed in the plurality of axially-oriented interior slots; and
wherein the plurality of surface-mounted permanent magnets are disposed in the plurality of axially-oriented recessed grooves.

* * * * *